Nov. 10, 1953           J. C. DART           2,658,859
CATALYTIC CONVERSION OF HYDROCARBONS
Filed March 5, 1949
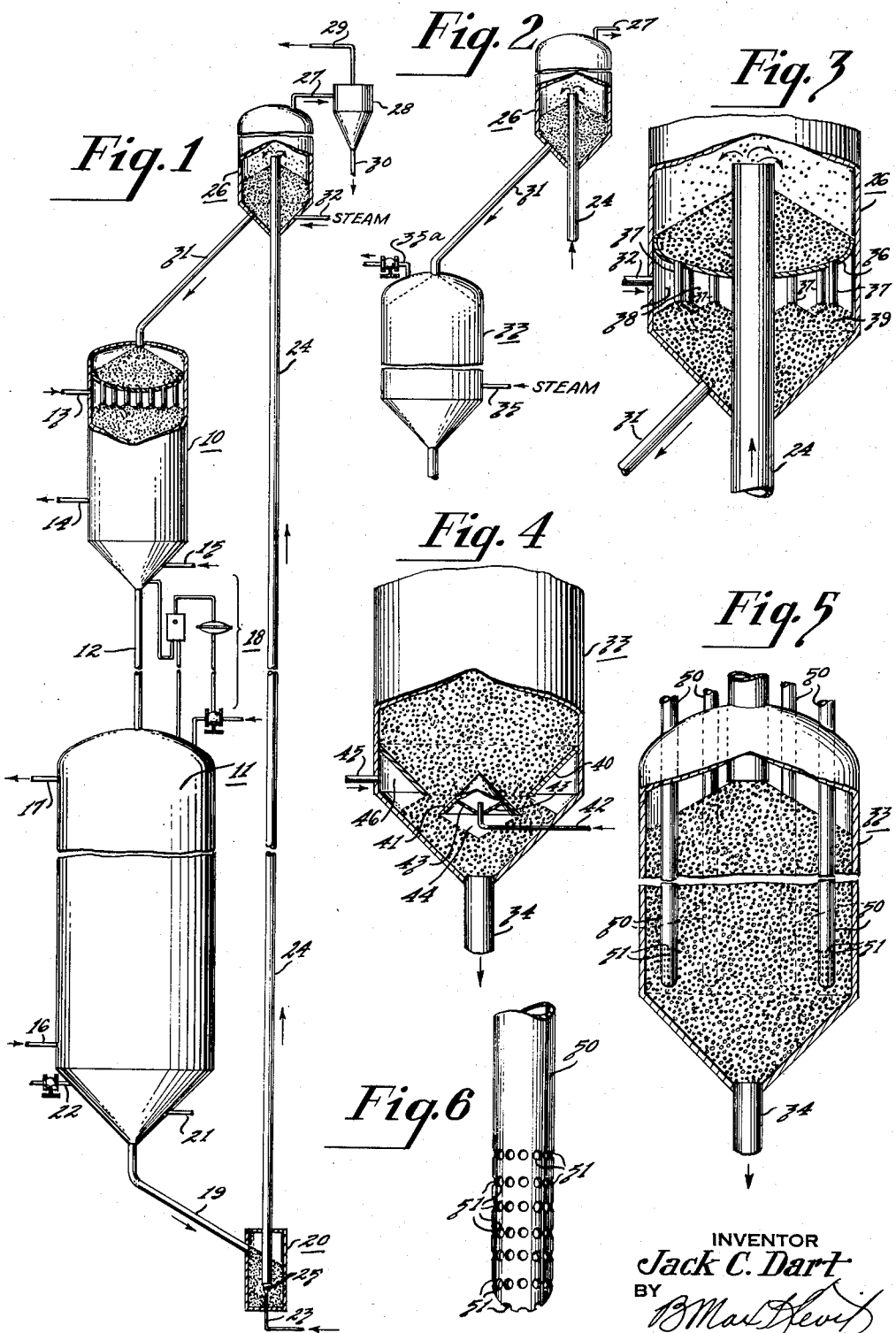
INVENTOR
Jack C. Dart
BY
ATTORNEY Patented Nov. 10, 1953

2,658,859

UNITED STATES PATENT OFFICE 2,658,859

CATALYTIC CONVERSION OF HYDROCARBONS

Jack C. Dart, Moylan, Pa., assignor to Houdry Process Corporation, Philadelphia, Pa., a corporation of Delaware Application March 5, 1949, Serial No. 79,753

10 Claims. (Cl. 196—52)

The present invention relates to improvements in systems and operations employed in hydrocarbon conversion processes and is particularly concerned with thermal control of such processes and the economic and beneficial utilization of heat therein.

The principles of the invention find their most important use in systems wherein hot regenerated catalyst discharged from a regeneration kiln is elevated by the force of a gaseous stream and conveyed thereby to a point above a reaction zone, in which zone an endothermic hydrocarbon conversion operation is carried out in contact with a compact moving bed of catalyst.

It has been observed that certain adsorptive contact masses, of which the well known active clay catalyst is a typical example, exhibit significant exothermic heat of hydration at elevated temperatures when treated with steam, which is adsorbed by the contact mass to the point of saturation; which is a function of type of mass and the conditions of operation. This observation is beneficially utilized in accordance with the present invention in connection with an operation wherein such solid adsorptive contact mass, such as one having an exothermic heat of hydration of at least 30 B. t. u. per pound adsorbent at 900° F., is contacted with hydrocarbons in two separate stages, and the heat loss and temperature drop of the contact mass during the first stage of the operation, is wholly or partially compensated by intermediate hydration so as to provide the desired heat content and temperature in the contact mass for the second stage operation. In accordance with a preferred practical operation of the invention, the first stage processing of hydrocarbons is effected by contacting hot freshly regenerated catalyst, such as that comprising acid-activated sub-bentonite clay, under selected conditions with hydrocarbon vapors to be processed in a conduit in which the hydrocarbons thus charged operate in vapor form as an elevating and/or transporting medium for the catalyst; this conduit terminates in a vapor disengaging zone. The resulting vaporous product is then disengaged from the catalyst, which may thus have become partially spent, and the catalyst is thereafter treated with steam and brought in thus hydrated condition to a second reaction zone through which the catalyst gravitates as a compact bed. This compact bed of catalyst is again contacted with hydrocarbons to be processed thereby, and the catalyst containing carbonaceous deposit formed from the hydrocarbons is discharged from the bed. The discharged catalyst is subsequently purged of adhering volatile materials and regenerated or reactivated prior to its being returned to the transporting conduit for recirculation in the system. In accordance with certain aspects of the invention, all or part of the effluent hydrocarbon vapors disengaged from the catalyst at the terminus of the transporting conduit may be charged for further treatment in the compact gravitating bed reactor; or in some instances, all or part of the hydrocarbon vapor effluent from the latter reactor may be charged to the bottom of the conduit to operate as the lifting and transporting medium, and may be further processed in contact with the solid catalyst transported thereby.

To obtain the noted beneficial effects of hydration of the catalyst or other solid contact mass having the indicated properties, the mass should be in a condition such that it can adsorb substantial quantities of steam up to the point of full saturation therewith. The increase in temperature and the sensible heat content of the catalyst or like solid mass resulting from hydration in the manner indicated, is then utilized to compensate heat losses and reduction in temperature that may take place as a result of cooling of the solid mass during transport in contact with the conveying gas. Such cooling may take place as a result of direct heat exchange of the solid mass with cooler transporting gas, and/or the giving up of heat by the mass to support an endothermic chemical reaction of the hydrocarbon vapors in contact therewith during transportation of the solid mass thereby.

Moreover, in typical systems wherein catalyst flows downwardly under the influence of gravity to a reaction vessel through a pressure sealed leg, the described prehydration of the catalyst enables the successful use of steam as a seal gas; whereas without such prehydration, the use of steam as seal gas might be precluded. Besides, steaming of catalyst, particularly catalyst of the clay type, has been found advantageous in connection with the cracking of high sulfur stocks, wherein the presence of steam on the catalyst has been found to exercise a significant effect against the abnormal aging of the catalyst which is ordinarily encountered in the treatment of these stocks with clay catalysts.

An additional advantage of the described system and operation is that lower temperatures can thus be employed during the elevation and/or transportation of the freshly regenerated catalyst discharged from the regenerating kiln, with consequent considerable savings in structural costs that would otherwise be necessary for expensive steel alloys such as may be required in operating at the higher temperatures approaching or exceeding 1000° F. These higher temperatures may, nevertheless, be utilized after discharging the catalyst from the lifting and transporting conduit, by adding heat to the catalyst as a result of hydration and prior to its use in the second stage operation carried out in the compact gravitating bed reactor.

Other advantages of the invention will be appreciated from the description which follows, read in connection with the accompanying drawing, illustrating several different forms of apparatus adapted for use in practical application of the invention, and wherein—

Figure 1 is a largely schematic vertical elevation, of one form of a hydrocarbon conversion system embodying the invention, parts being broken away to show internal structure in section; Figure 2 is a similar view of only the upper portion of such a system illustrating a modified embodiment; Figures 3, 4 and 5 are enlarged views in vertical elevation and partly in section of the catalyst supply portion of an apparatus that may be used in connection with systems such as illustrated in Figures 1 or 2, or in similar systems, and illustrate further alternative modifications; Figure 6 is a further enlarged detailed view of one of the steam lances shown in Figure 5.

Referring particularly to Figure 1, the illustrated hydrocarbon conversion system comprises a reactor 10 adapted to contain a compact gravitating bed of a solid granular or pelleted contact mass, such as catalyst. The catalyst or other solid contact mass containing carbonaceous deposit, called "coke," formed as a result of contact with hydrocarbons in the reactor 10 is continuously discharged from that reactor to a regenerating kiln 11 by means of a pressure sealed conduit 12. Hydrocarbons to be reacted are brought into the reactor 10, as illustrated, by means of a supply line 13 and the formed conversion products are discharged from the reactor by a suitable line illustrated at 14. In the illustrated embodiment the hydrocarbons will flow concurrently with the catalyst. As is known, this system may be reversed to provide for counter-current flow of hydrocarbon vapors; by supplying the hydrocarbons through line 14 and discharging reaction products formed through line 13. Prior to discharge of the catalyst from reactor 10, and in the lower portion of the reactor, the mass passes through a purge zone where it is contacted with an inert gas such as steam or flue gas, for the removal of adhering vaporizable materials therefrom. The purge gas may be brought into the reactor by means of a line communicating therewith as illustrated at 15, the purge vapors leaving the reactor together with the hydrocarbon reaction products discharged, for instance, through line 14.

In the kiln 11 the compact downwardly moving bed of hot catalyst is brought into contact with an oxygen-containing regenerating gas, such as air, thereby effecting combustion of the coke from the mass.

The regenerating gas may be brought in the kiln as by means of a suitable line 16, and the formed combustion gases discharged from the upper portion of the kiln as by means of a line 17. As understood in the art, conventional kilns may employ cooling coils within the kiln (not shown) for guarding against high temperatures above about 1150° F. being generated, which may be detrimental to the catalyst. In order to prevent the flow of incompatible gases between the reactor 10 and the kiln 11 a constant pressure control means, generally indicated at 18, is employed to maintain a fixed pressure differential between the two vessels. A portion of the purge gas admitted through line 15 may be permitted to flow through conduit 12 as seal gas.

The catalyst discharged from the kiln 11 flows through a pressure sealed conduit 19 into a receiving hopper 20. To prevent the escape of gases from the kiln into the conduit 19 or from the hopper 20 into the kiln a sealing zone is maintained between the bottom of the kiln and hopper 20. This is accomplished for instance by the introduction of a seal gas into the bottom of the kiln, as illustrated, by the line 21. Any substantially dry, inert gas may be employed for the purpose; the use of steam being preferably avoided for reasons which will hereinafter appear. The introduced seal gas may be withdrawn at the bottom of the kiln as by means of a line 22, or in some instances may be permitted to pass upwardly through the kiln for discharge through line 17 with the flue gases formed in the kiln.

The bed of catalyst accumulating in the hopper 20 is contacted with an upwardly directed stream of a lifting and transporting gas in the form of hydrocarbon vapors introduced into the hopper through jet 23, whereby the catalyst is impelled upwardly into the lift conduit 24. As is illustrated in Figure 1, the bottom of the lift conduit 24 extends below the top level of the bed of catalyst in the hopper 20. This is important to assure desired high catalyst flow rates with minimum gas expenditure, and the maintenance of a uniform stream of catalyst moving upwardly through the conduit 24. The hopper 20 may be of any desired configuration, but should be of sufficient lateral cross-section to permit the necessary flow of catalyst from the conduit 19 into the hopper 20, by providing ample space between the periphery of the conduit 24 and the inner walls of the hopper. Between the discharge tip of jet 23 and the bottom of conduit 24 a gap is provided as indicated at 25, into which gap the catalyst continuously flows to be impelled into the conduit 24 by the lift gas. Provision may be made for adjustment of the length of this gap, as by suitable means for raising or lowering the jet 23, and thereby providing a means for controlling the rate of circulation of catalyst in the system. By maintaining a higher pressure at the point of introduction of the seal gas through line 21, all of the gas introduced by means of jet 23 will be directed into the lift conduit 24 carrying along therewith catalyst passing into the path thereof in the gap 25.

The lift conduit 24 discharges into a disengaging chamber 26 positioned at a height above the top of the reactor 10. As a result of reduction in gas velocity occasioned by the differences in cross-section between the lift pipe 24 and the disengaging chamber 26, the catalyst is separated from the lift gas and falls downwardly in the chamber to form a dense compact bed therein. The lift gas separted from the catalyst is withdrawn from the chamber through an overhead line as indicated at 27. Means are provided for separation of fines from the disengaged gas, as in a form of a cyclone separator represented at 28, communicating with the overhead discharge line 27; the gas, free of fines being withdrawn overhead as by means of a line 29, while the separated fines are discharged at the bottom as by means of line 30. The top closure of the disengaging chamber 26 should be located at a sufficient height above the discharge outlet of conduit 24 such that the emerging fountain of catalyst is not forcibly impelled against said top. Catalyst from the compact bed formed in the chamber 26 is withdrawn as by means of a conduit 31, which, in the illustrated embodiment of Figure 1, communicates directly with the top of the reactor 10. Within the disengaging chamber 26 the bed of catalyst is subjected to hydration, in the illustrated embodiment, by means of steam brought into the chamber through a line 32. The amount of steam introduced should be slightly in excess of that required in order to assure complete hydration of the catalyst to its saturation point at the prevailing temperature. Excess steam which is not adsorbed by the catalyst will be discharged either through line 27 or through conduit 31 depending upon the relative pressures maintained.

The hydrocarbon vapors discharged through line 29 may be sent to a fractionating system for separation into desired fractions, separately or together with the reaction products discharged from the reactor 10, and a selected fraction may be recycled to jet 23 for use in the elevation of catalyst and to be treated in contact with catalyst during transportation in the conduit 24.

The invention is not limited in its application to an arrangement such as is particularly illustrated in Figure 1, but may be employed in other arrangements wherein hydrocarbons are employed for lifting or transporting of catalyst or other contact mass, discharged from a regenerating kiln, to a point above a compact bed reactor. For instance, instead of the reactor 10 being located above the kiln 11, the two may be placed side by side; in which event means will also be provided for elevating catalyst discharged from the reactor to a point feeding to the top of the kiln, which means may be a mechanical elevator or a gas lift employing any desired gaseous lifting medium. In the latter instance, using hydrocarbons as the lift gas, a single lift conduit such as 24 may be employed, catalyst from the kiln as well as from the reactor discharging to a common accumulating hopper such as 20, with proper arrangement of pressure balance and sealing gas to prevent intermixture of hydrocarbons with the air admitted to the kiln.

In Figure 2, a modified embodiment is illustrated, wherein a catalyst supply hopper is interposed between the reactor 10 and the disengaging vessel 26. In accordance with this modification, the hydrating steam is introduced into the catalyst supply hopper instead of into the disengaging chamber. Thus catalyst is brought from the bed formed in the disengaging chamber 26, through the conduit 31 into the catalyst supply hopper 33, and discharged from the hopper through a conduit 34 communicating with the top of the reactor 10. Steam is brought into the hopper 33 by means of a line illustrated at 35. If desired, excess steam and volatiles removed from the catalyst by the steam may be discharged through valve-controlled line 35a.

Although in Figures 1 and 2 the introduction of steam is effected, as illustrated, by the simple use of a steam line communicating with the disengaging chamber or with the catalyst supply hopper respectively, it is preferred to employ other arrangements, such as is illustrated in Figures 3, 4, and 5, to assure complete and uniform hydration with the minimum steam requirement. In the modification depicted in Figure 3, the disengaging chamber 26 is provided, below the discharge mouth of conduit 24, with the tube sheet 36 and downcomers 37, providing a plenum 38 between the surface of the catalyst bed 39 in the bottom of the chamber 26 and the under surface of the tube sheet. Thus, the catalyst discharged from the conduit 24 initially accumulates on the upper surface of the tube sheet 36, discharging by gravity through the downcomers to form a bed of catalyst, which is continuously being withdrawn through the conduit 31. One or more steam lines 32 communicates directly with the plenum 38, and the steam admitted is distributed substantially over the surface of the bed of catalyst therebelow, entering into the bed to effect hydration of the catalyst.

In the modification illustrated in Figure 4, the catalyst supply hopper 33 is shown as provided with a funnel shaped circumferentially extending baffle member 40 and a centrally located hollow cone 41. The catalyst passing through the hopper is restricted in its passage near the bottom of the hopper between the outer wall of the hollow cone 41 and the inner surface of the baffle member 40. A steam line 42 communicates with the inner hollow provided in cone 41, the steam line being rigidly affixed to the cone as by means of a supporting member 43. Below the base of the cone 41, the gravitating bed of catalyst will assume its normal angle of repose and thereby provide a plenum, as indicated at 44, which plenum will be filled with steam through the line 42 and pass into the bed of catalyst therebelow and upwardly through the restricted catalyst path between the cone and the baffle member 40. If required or desired, additional steam may be introduced into the hopper as by means of a line 45 entering the space 46 provided between the outer surface of the baffle member 40 and the inner wall of the hopper member 33. The supporting member 43 may be made up of spaced bars or a perforated plate, permitting free flow of steam.

In Figure 5, the hopper 33 is shown as provided with a number of vertical steam lances 50 passing downwardly through the catalyst bed. These lances are perforated at their lower ends as indicated at 51 (Figure 6).

It will be understood that the particular arrangement for introducing steam into the disengaging chamber 26 as shown in Figure 3 may likewise be employed in connection with the introduction of steam into the catalyst supply hopper 33; and alternatively, means for introducing steam particularly illustrated in connection with Figures 4 and 5 may be applied for introduction of steam into the disengaging chamber 26.

In all of the disclosed embodiments, whether the steam is introduced into the disengaging chamber 26 or alternatively into the supply hopper 33, the steaming operation is effected intermediate the transportation of catalyst or contact mass with hydrocarbons and a second stage of contact of the catalyst discharged from the transporting system with hydrocarbons in a compact downwardly moving bed. The amount of steam employed should be sufficient at least to saturate the catalyst or other contact mass therewith, to effect thereby a material elevation in catalyst temperature as a result of the exothermic heat of hydration. In order to obtain the full advantage of the heat of hydration, the catalyst discharged from the lift conduit 24 should be fairly dry. For this reason the use of steam as a seal gas at the bottom of the kiln 11 and the introduction of steam into the lift hopper 20 are kept to a practical minimum or avoided entirely if possible.

The intermediate hydration step, in accordance with the invention, can be advantageously utilized in various ways in its practical application, which are not limited to the particular operations hereinafter described by way of example. As a general rule, the sequence of operations conducted in the lift pipe and in the reactor 10 is selected in a manner consistent with the condition of the catalyst. Since freshly regenerated catalyst is charged to the lift pipe and the catalyst entering the reactor 10 will already normally contain some coke deposited therein from the preceding operation in the lift, this factor of coke content must be taken into consideration in selecting the sequence of operations. Moreover, the amount of coke deposited in the freshly regenerated catalyst during the first stage operation must be controlled with relation to the effect of the presence of a particular quantity of coke in the catalyst on the subsequent hydrocarbon conversion reaction or treatment desired to be carried out in contact with the catalyst during the second stage operation. For most, if not all processes requiring catalyst at a fairly high level of activity, the coke deposited in the catalyst during the first stage operation should desirably be as low as possible and generally not be permitted to exceed about 1.5% (by weight) of the catalyst admitted to the reactor 10. In other operations, wherein the second stage treatment can be carried out with relatively inert adsorptive contact mass or with catalyst of moderate catalytic activity level, larger amounts of coke may be permitted to accumulate in the catalyst during the first stage operation. Examples of operations not particularly requiring catalyst at high levels of activity are the cracking of comparatively non-refractory heavy petroleum stocks and the preparation of stocks for further catalytic processing; such as by initial removal of nitrogeneous contaminants therein, which otherwise interfere with a subsequent catalytic cracking operation. In any event, however, the total amount of coke on the catalyst as a result of deposits formed during both stages of operations in contact therewith, should be kept within the normal coke-burning capacity of the regenerating kiln employed in the system. In practical operation, in order to stay within reasonable and commensurate kiln construction costs, the total amount of coke deposited in the catalyst as subjected to regeneration should ordinarily not exceed about 4% by weight of the catalyst.

In accordance with a preferred operation consistent with the factors set out above, a gasoline or other light naphtha fraction, in vaporized condition, is contacted with freshly regenerated non-hydrated acid-activated clay or like catalyst supplied to the lift hopper 20. The vaporized hydrocarbon charge, supplied at suitable velocity, operates as a lifting and transporting medium for the solid catalyst. During such transportation of the catalyst in the lift pipe 24 and while in contact with these hydrocarbon vapors, the reaction conditions are maintained to favor conversion of the hydrocarbons in such a way as to enhance the quality thereof as a result of such processing, including improvement in anti-knock qualities. Such upgrading of the hydrocarbon charge may involve any one or more of a number of different chemical reactions that may take place in the lift pipe, including cracking of naphthenic or other less refractory portions of the hydrocarbon charge to simpler or lower molecular weight hydrocarbons, particularly those in the gasoline boiling range; polymerization of diolefins present in the charge, and decomposition and removal of deleterious components and contaminants, particularly sulfur compounds. Certain of these reactions also tend to improve the lead susceptibility of the gasoline produced in addition to increasing the unleaded anti-knock rating thereof.

The operating conditions for thus reforming or otherwise upgrading of a naphtha fraction include reaction temperatures preferably above 1000° F. The charge may be a straight run naphtha fraction or one derived from catalytic cracking. In the latter instance, the catalytically cracked naphtha may be a recycled portion of a distillate obtained from catalytic cracking of a hydrocarbon charge in the reactor 10. The vapor products obtained as a result of the reactions conducted in the lift pipe are separated from the catalyst in the disengaging chamber 26 or alternatively in the catalyst supply hopper 33 (compare Figures 1 and 2), from whence they are passed to a fractionating system for removal of fixed gases and for separation of the condensed normally liquid products into desired fraction of selected boiling ranges, one of which may include an improved gasoline fraction. The bottoms from fractionation, if desired, or other separated intermediate fractions may be sent to the reactor 10 or to a separate system for further cracking or other catalytic conversion or treatment.

In the treatment of a gasoline or other light naphtha fraction for the purpose principally of removing sulfur contaminants, the operating conditions may be modified from that previously described. For this purpose lower temperatures of treatment and higher space rates can be employed. A typical desulfurizing operation carried out on a gasoline fraction involves temperatures in the range of 750–800° F. and space rates of about 4 to 10, and catalyst to oil ratios from 4 to 35 (weight basis). The hydrogen sulfide formed in the desulfurization of the charge is separated from the $C_4$ and higher hydrocarbon fraction together with the other fixed gases produced. Occluded volatile sulfur compounds then may be largely removed from the catalyst by the steaming operation which is performed in the disengaging chamber 26 or in catalyst supply hopper 33. The operations that can be conducted during the transportation of catalyst in the lift pipe 24, include cracking or other treatment of relatively light hydrocarbons. In certain operations it may be found desirable to initially crack heavier charge, such as a heavy gas oil, in the lift pipe and further crack or otherwise treat all or a portion of the effluent in the compact bed reactor 10. Other similar endothermic operations that may advantageously be carried out in the lift pipe in conjunction with particular hydrocarbon processing operations conducted on the same contact mass in the subsequent down-flow compact bed reactor will be apparent to those skilled in the art from the foregoing illustrative examples.

In any of the described endothermic reactions carried out in the lift pipe, the catalyst gives up heat to raise the temperature of the charge and to support the endothermic reaction; the catalyst is thereby reduced in temperature. This loss in sensible heat and reduction in catalyst temperature is then compensated by the hydration step which follows. The temperature rise that can be produced by the hydration of any particular catalyst or other solid adsorptive contact mass depends principally on the amount of water that still can be added to bring the mass to its point of saturation, which will vary with the temperature of the mass and the partial pressure of the steam.

The table below, based on our experience, illustrates the approximate quantity of water (as 100% steam) adsorbed on typical acid activated clay catalyst containing about 1.0% coke by weight of the catalyst to effect saturation thereof, and the corresponding temperature elevation that may be obtained. This catalyst over the temperature range considered exhibits a heat of hydration in excess of 1200 B. t. u. per lb. of water adsorbed.

Table

| Initial Catalyst Temperature, °F | 850 | 900 | 1,000 |
|---|---|---|---|
| Steam added, wt. percent on catalyst | 1.2 | 1.1 | .7 |
| Final temperature of hydrated catalyst, °F | 955 | 990 | 1,065 |

The following example described one type of operation in accordance with the invention:

A 500–700° F. cut of an East Texas gas oil is admitted to the lift hopper 20 at a pressure of 12 pounds per square inch gauge. Freshly regenerated acid activated clay catalyst is introduced into the lift hopper at 910° F. in the ratio of 5 parts of catalyst by weight to one of oil. The oil vapors effect elevation and transportation of the catalyst in contact therewith through the conduit 24 into the disengaging vessel 26, with resulting decrease in temperature; the catalyst being at about 840° F. at the top of the lift. Hydrocarbon vapors are disengaged from the catalyst and discharged overhead from vessel 26 at 8 pounds per square inch, at which same pressure the total hydrocarbon effluent is charged to the reactor 10.

The catalyst in the vessel 26 is treated with steam to hydrate the same to the extent of the desired elevation in temperature. Thus the catalyst may be brought back to 910° F. by adsorption thereon of approximately 0.5% by weight of steam, and the hydrated catalyst passed to the top of reactor 10 at that temperature to again contact the hydrocarbon vapors therein under concurrent flow conditions of hydrocarbons and catalyst.

The cracking operation in reactor 10 will be at an average temperature of about 900° F., and operating at a liquid space rate of 2 parts by weight of oil to one part of catalyst per hour, about 60% conversion of the hydrocarbon charge is obtained, the vapor conversion products being withdrawn from the bottom of the reactor at a pressure of about 5 pounds per square inch.

The above operation is merely illustrative and not intended as a limitation on the operative scope of the invention.

Obviously many modifications and variations of the invention as hereinbefore set forth may be made without departing from the spirit and scope thereof and therefore only such limitations should be imposed as are indicated in the appended claims.

I claim:

1. The process which comprises contacting a hot hydratable adsorbent contact mass while in hydratable condition with transporting hydrocarbon vapors to transport said mass to a fixed location above a reaction zone, said vapors comprising hydrocarbons subject to endothermic conversion in the presence of the contact mass and said contact mass having the property of providing exothermic heat of hydration at elevated temperatures, maintaining operating conditions during such transportation to effect conversion of hydrocarbons in said vapors by endothermic reactions, separating said contact mass from said transporting hydrocarbon vapors at said location, introducing the thus separated contact mass into a reaction zone for further contact with hydrocarbons to be processed in contact therewith at elevated temperature, and hydrating said contact mass while still at an elevated temperature by adsorption of steam thereon intermediate said location and said reaction zone, thereby raising the temperature of the contact mass materially above the temperature of said mass when initially separated from the transporting hydrocarbon vapors at said location, and thereby also resorting to the contact mass at least in part sensible heat given up by said mass during transportation by said hydrocarbon vapors.

2. The process of catalytic conversion of hydrocarbons employing clay catalyst which comprises contacting hydrocarbons with clay catalyst in hydrated condition in a reaction zone under endothermic reaction conditions, regenerating catalyst discharged from said reaction zone and raising the catalyst temperature, contacting the hot freshly regenerated catalyst in non-hydrated condition with a stream of hydrocarbon vapors under sufficient pressure to transport said catalyst to an accumulating zone and under conditions effecting transfer of heat from said catalyst to surrounding hydrocarbon vapors by endothermic conversion of hydrocarbons in said vapors and with accompanying reduction in catalyst temperature, discharging catalyst from said accumulating zone and introducing the discharged catalyst into the first recited reaction zone, and hydrating the catalyst to substantial saturation by contact with steam, said hydration being effected prior to further contact of the catalyst with hydrocarbons in said reaction zone, thereby providing hydrated catalyst at desired temperature for use in said first recited reaction zone.

3. Process in accordance with claim 2 wherein the contact of the catalyst with steam for hydration of said catalyst is effected in said accumulating zone.

4. Process in accordance with claim 2 wherein said stream of hydrocarbon vapors transporting said catalyst is at a temperature substantially lower than that of the catalyst initially contacted thereby.

5. Process in accordance with claim 2 wherein at least a portion of the reaction products resulting from the conversion of hydrocarbons in said transporting stream of hydrocarbon vapors is further contacted with hydrated catalyst in the first recited reaction zone.

6. The process which comprises contacting a mass of particles of hot freshly regenerated clay catalyst of the acid-activated sub-bentonite type with a transporting stream of cooler hydrocarbon vapors to lift said catalyst as a mass in a confined path to a vapor disengaging zone, said vapors including hydrocarbons subject to chemical conversion in the presence of said catalyst and said catalyst being in a condition capable of adsorbing substantial quantities of steam, separating hydrocarbon vapors from the catalyst in said disengaging zone, accumulating the catalyst thus freed of hydrocarbon vapors as a compact bed below said disengaging zone, introducing steam into said bed of catalyst to effect hydration of said catalyst with consequent elevation of the catalyst temperature as a result of exothermic heat of adsorption of the steam thereon, continuously discharging hydrated catalyst from said bed by gravity and continuously feeding the hydrated catalyst to a confined reaction zone, passing the catalyst through said reaction zone as a compact moving bed, contacting the compact bed of catalyst in said reaction zone with hydrocarbons continuously introduced into said reaction zone, maintaining selected conditions of hydrocarbon feed rate and temperature in said reaction zone to effect catalytic conversion of the hydrocarbons in contact with said catalyst, thereby forming vaporous reaction products of said hydrocarbons with concomitant deposition of coke in said catalyst, withdrawing said vaporous reaction products from said reaction zone, discharging coke-containing catalyst from the bottom of said reaction zone, introducing the thus discharged coke-containing catalyst into a regenerating zone, contacting the catalyst in said regenerating zone with oxidizing gas to burn said coke, discharging the catalyst from the regenerating zone, and returning thus freshly regenerated catalyst to contact with a transporting stream of hydrocarbon vapors for repeated circulation as recited; the transporting stream of hydrocarbon vapors being maintained in contact with the catalyst during such lifting for a sufficient period and at selected temperature conditions to effect chemical conversion of said hydrocarbons under endothermic reaction conditions, at least a portion of the required heat for such conversion being furnished by the catalyst.

7. Process in accordance with claim 6 including the step of fractionating said vaporous reaction products withdrawn from said confined reaction zone, and utilizing a selected portion of said vaporous reaction products in lifting of catalyst to said vapor disengaging zone.

8. Process in accordance with claim 6 wherein said transporting stream of hydrocarbon vapors is a naphtha fraction, and said naphtha fraction is improved in quality as a result of catalytic conversion while in contact with said catalyst in lifting the catalyst to said vapor disengaging zone.

9. Process in accordance with claim 6 wherein the hydrocarbons contacted with said compact bed of catalyst in said reaction zone have a boiling range higher than gasoline, and are catalytically cracked in said reaction zone to produce among said vaporous reaction products substantial quantities of hydrocarbons in the boiling range of gasoline.

10. Process in accordance with claim 6 wherein the resulting temperature during lifting of the catalyst through said confined path by said transporting stream of hydrocarbon vapors is maintained below 1000° F.

JACK C. DART.

References Cited in the file of this patent

UNITED STATES PATENTS

| Number | Name | Date |
|---|---|---|
| 2,398,759 | Angell | Apr. 23, 1946 |
| 2,409,353 | Giuliani et al. | Oct. 15, 1946 |
| 2,459,824 | Leffer | Jan. 25, 1949 |
| 2,471,398 | Simpson et al. | May 24, 1949 |
| 2,490,774 | Bland | Dec. 13, 1949 |
| 2,526,701 | Shirk | Oct. 24, 1950 |

OTHER REFERENCES

"Cracking sulfur stocks with natural catalyst," by R. C. Davidson, Petroleum Refiner, Sept. 1947, vol. 26, No. 9 (10 pages).